(12) United States Patent
Rathje

(10) Patent No.: US 6,823,123 B2
(45) Date of Patent: Nov. 23, 2004

(54) METHOD AND APPARATUS FOR PROVIDING DISPERSION COMPENSATION

(75) Inventor: Jacob Rathje, Frederiksberg C (DK)

(73) Assignee: Fitel USA Corporation, Norcross, GA (US)

( * ) Notice: Subject to any disclaimer, the term of this patent is extended or adjusted under 35 U.S.C. 154(b) by 181 days.

(21) Appl. No.: 10/237,002

(22) Filed: Sep. 6, 2002

(65) Prior Publication Data

US 2004/0047574 A1 Mar. 11, 2004

(51) Int. Cl.[7] .............................. G02B 6/00; G02B 6/02
(52) U.S. Cl. ..................... 385/123; 398/115; 385/147
(58) Field of Search .................... 385/24, 122, 123, 385/129, 147; 398/100, 115

(56) References Cited

U.S. PATENT DOCUMENTS

| | | | |
|---|---|---|---|
| 4,261,639 A | | 4/1981 | Kogelnik et al. |
| 4,969,710 A | | 11/1990 | Tick et al. |
| 5,191,631 A | | 3/1993 | Rosenberg |
| 5,361,319 A | * | 11/1994 | Antos et al. .............. 385/123 |
| 5,430,822 A | | 7/1995 | Shigematsu et al. |
| 6,366,728 B1 | * | 4/2002 | Way et al. ................ 385/123 |
| 6,404,964 B1 | * | 6/2002 | Bhagavatula et al. ....... 385/123 |
| 6,574,037 B2 | * | 6/2003 | Islam et al. ............... 359/334 |
| 2002/0063948 A1 | * | 5/2002 | Islam et al. ............... 359/334 |
| 2002/0114597 A1 | | 8/2002 | Brimacombe et al. |
| 2003/0189750 A1 | * | 10/2003 | Islam et al. ............... 359/334 |
| 2003/0190118 A1 | * | 10/2003 | Edvold et al. .............. 385/24 |

FOREIGN PATENT DOCUMENTS

WO    WO 02/37718 A2    5/2002

* cited by examiner

*Primary Examiner*—Akm Enayet Ullah
(74) *Attorney, Agent, or Firm*—Gardner Groff, P.C.

(57) ABSTRACT

The present invention enables the usable bandwidth of an optical fiber transmission link to be increased. The transmission fiber of the link with a is coupled with a dispersion compensation fiber (DCF+) that has a positive dispersion and a dispersion slope such that the relative dispersion slope (RDS) of the DCF+ is lower than the RDS of the transmission fiber. Because the RDS of the DCF+ is lower than the RDS of the transmission fiber, the RDS of the combination of the transmission fiber and the DCF+ below the RDS of the transmission fiber. When the DCF+ is combined with a DCF having a negative dispersion (DCF–), the transmission link is dispersion compensated by DCF– and the usable bandwidth of the optical fiber transmission link is increased compared to the compensation of the transmission fiber by a single DCF–.

21 Claims, 4 Drawing Sheets

METHOD AND APPARATUS FOR PROVIDING DISPERSION COMPENSATION

TECHNICAL FIELD OF THE INVENTION

The present invention relates to optical fibers and, more particularly, to providing dispersion compensation in an optical fiber transmission system over a broad range of wavelengths.

BACKGROUND OF THE INVENTION

Dispersion in a glass fiber causes pulse spreading for pulses that include a range of wavelengths, due to the fact that the speed of light in a glass fiber is a function of the transmission wavelength of the light. Pulse broadening is a function of the fiber dispersion, the fiber length and the spectral width of the light source. Dispersion for individual fibers is generally illustrated using a graph having dispersion on the vertical axis (in units of picoseconds (ps) per nanometer (nm), or ps/nm) or ps/nm-km (kilometer) and wavelength on the horizontal axis. There can be both positive and negative dispersion, so the vertical axis may range from, for example, −250 to +250 ps.

For example, typical single mode fibers generally transmit best (i.e., with minimum attenuation) at 1550 nm, whereas dispersion for the same fiber would be approximately zero at 1310 nm. The theoretical minimum loss for glass fiber is approximately 0.16 db/km, and that occurs at the transmission wavelength of about 1550 nm. Because minimum attenuation is prioritized over zero dispersion, the wavelength normally used to transmit over such fibers is typically 1550 nm. Also, Erbium-doped amplifiers, which currently are the most commonly used optical amplifiers for amplifying optical signals carried on a fiber, operate in 1530 to 1565 nm range. Because dispersion for such a fiber normally will not be zero at a transmission wavelength of 1550 nm, attempts are constantly being made to improve dispersion compensation over the transmission path in order to provide best overall system performance (i.e., low optical loss and low dispersion).

Many techniques have been used for dispersion compensation, including the design and use of dispersion-shifted and dispersion flattened fibers. Dispersion Compensating Modules (DCMs) have also been used in optical communications systems for dispersion compensation, especially in wavelength division multiplexing (WDM) systems. A number of patents describe various uses of DCMs to compensate dispersion including: U.S. Pat. No. 4,261,639 (Kogelnik et al.); U.S. Pat. No. 4,969,710 (Tick et al.); U.S. Pat. No. 5,191,631 (Rosenberg); and U.S. Pat. No. 5,430,822 (Shigematsu et al.). These patents compensate dispersion by inserting DCMs at appropriate intervals along the transmission path. The DCMs usually contain Dispersion Compensating Fiber (DCF) of an appropriate length to produce dispersion of approximate equal magnitude (but opposite sign) to that of the transmission fiber.

One problem with using the known DCMs to compensate dispersion is that DCF designs generally are sensitive to production tolerances. Therefore, if the DCF design is not highly precise, then when the DCF is combined with the transmission fiber, the resulting transmission link may have too much residual dispersion (i.e., dispersion on wavelength channels other than the center wavelength channel being compensated). This is especially true in broadband communications systems in which transmission rates are very high (e.g., 40 gigabits per second (Gbit/s)). Also, once the DCF is produced, only the length of the DCF can be selected to meet the desired target for dispersion compensation. Moreover, selection of the DCF length (and thus the dispersion of the DCM) should ensure that first order and higher order dispersion are compensated.

When compensating for higher order dispersion, the Relative Dispersion Slope (RDS) of the transmission fiber should match the RDS of the DCF (and, consequently, of the corresponding DCM). For a given fiber, the RDS is defined as the ratio of the dispersion slope, S, of the fiber to the dispersion, D, of the fiber. Thus, the RDS for a given fiber is equal to S/D for that fiber. For a DCF combined with a transmission fiber, the total dispersion and the total dispersion slope of the compensated link, $D_{LINK}$ and $S_{LINK}$, respectively, can be expressed by Equations 1 and 2, respectively, as follows:

$$D_{Link} = D_{TransmFiber} \times L_{TransmFiber} + D_{DCF} \times L_{DCF} \quad \text{(Eq. 1)}$$

$$S_{Link} = S_{TransmFiber} \times L_{TransmFiber} + S_{DCF} \times L_{DCF} \quad \text{(Eq. 2)}$$

In Equation 1, $D_{TransmFiber}$ corresponds to the dispersion of the transmission fiber, $L_{DCF}$ corresponds to the length of the DCF, and $D_{DCF}$ corresponds to the dispersion of the DCF. In Equations 1 and 2, $L_{TransmFiber}$ corresponds to the length of the transmission fiber and $L_{DCF}$ corresponds to the length of the DCF. In Equation 2, $S_{TransmFiber}$ corresponds to the dispersion slope of the transmission fiber and $S_{DCF}$ corresponds to the dispersion slope of the DCF.

When the dispersion of the system is compensated, i.e., when $D_{Link}=0$, the length of DCF needed to compensate for the dispersion of the link can be determined by Equation 3 as follows:

$$L_{DCF} = L_{TransnFiber}/D_{DCF}) \times L_{TransnFiber}. \quad \text{(Eq. 3)}$$

In order to compensate the link for the dispersion of the DCF, the RDS for the DCF and for the transmission fiber are matched such that:

$$RDS_{TransFiber} = \frac{S_{TransFiber}}{D_{TransFiber}} = \frac{S_{DCF}}{D_{DCF}} = RDS_{DCF} \quad \text{(Eq. 4)}$$

It is desirable that the compensated wavelength range be as wide as possible. An inverse relationship exists between the usable bandwidth and the RDS of the transmission fiber. Thus, the RDS of the transmission fiber limits the usable bandwidth of the transmission link.

It would be desirable to provide a dispersion slope compensation module that increases the usable bandwidth of a dispersion compensated transmission fiber, lo compared to the usable bandwidth associated with using a single dispersion compensating fiber, especially in cases where the transmission fiber has a high RDS.

SUMMARY OF THE INVENTION

In accordance with the present invention, it has been determined that the usable bandwidth of an optical fiber transmission link can be increased by coupling the transmission fiber of the link with a positive dispersion compensation fiber (hereinafter "DCF+") that has a positive dispersion and a dispersion slope such that the relative dispersion slope (RDS) of the DCF+ is lower than the RDS of the transmission fiber. Because the RDS of the combination of fibers is lower than the RDS of the transmission fiber, when the transmission link is compensated, there is an increase in the usable bandwidth of the transmission link.

The present invention provides a dispersion compensation module (DCM) for increasing the usable bandwidth of the optical fiber transmission link after dispersion compensation with negative dispersion compensating fiber. The DCM comprises at least one DCF+ that has an RDS that is lower than the RDS of the transmission fiber. When the DCM is coupled to the transmission fiber, the DCF+ adds an amount of positive dispersion. Because the RDS of the transmission fiber is higher than that of the DCF+, the overall RDS of the transmission link is lowered below that of the transmission fiber, which results in more usable bandwidth for the transmission link when it is compensated.

The present invention also provides a DCM that contains both a DCF+ as described above and negative dispersion compensation fiber (hereinafter a "DCF−") with a dispersion of equal amount and opposite sign to that of the combined transmission fiber and DCF+. The DCF− has an RDS that is at least substantially equal to that of the combined transmission fiber and DCF+.

These and other features and advantages of the present invention will become apparent from the following description, drawings and claims.

DETAILED DESCRIPTION OF THE PREFERRED EMBODIMENTS

Figure 1:
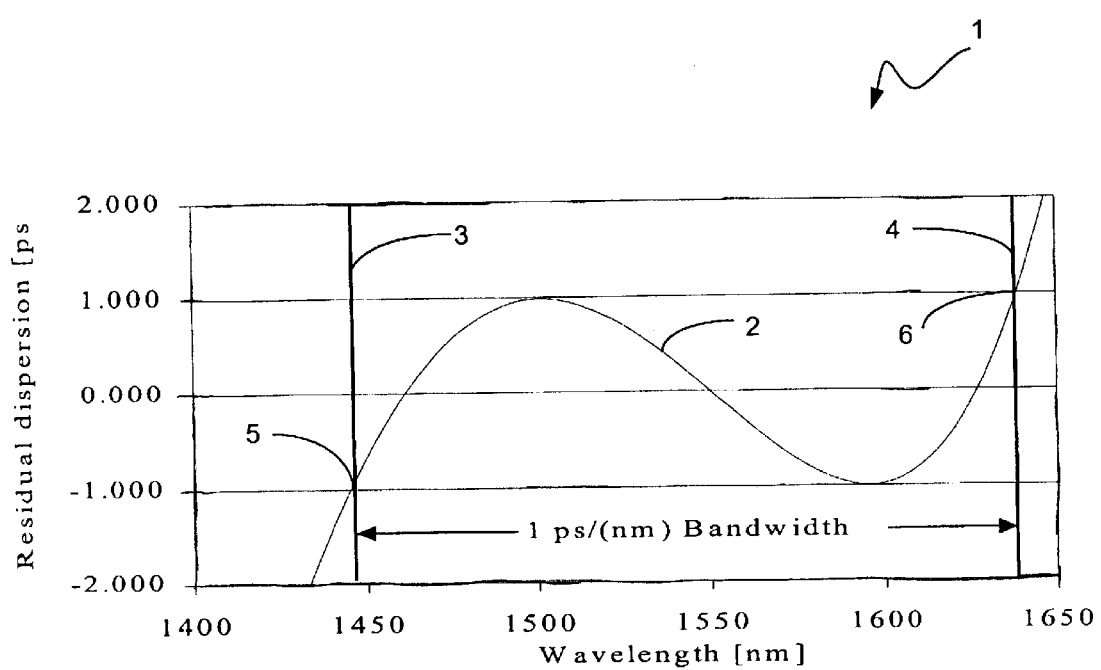
FIG. 1 is a graph illustrating the residual dispersion as a function of wavelength in a known transmission fiber that has been compensated by coupling it with a DCF−; The dispersion of the transmission fiber that has been compensated in this example is 100 ps/nm at 1550 nm.

FIG. 1 is a graph illustrating the residual dispersion as a function of wavelength in a known transmission fiber that has been compensated by coupling it with a DCF. The dispersion of the transmission fiber that has been compensated is 100 ps/nm at 1550 nm. The usable bandwidth corresponds to the portion of the curve 2 between the vertical lines 3 and 4. The usable bandwidth is defined as the maximal bandwidth where the residual dispersion is within the range of ±1 ps/nm. At locations 5 and 6 on the curve 2, the residual dispersion falls out of this range. The maximal bandwidth for the example shown in FIG. 1 is from approximately 1450 nm to approximately 1650 nm.

As stated above, in accordance with the present invention, it has been determined that the usable bandwidth for a transmission optical fiber can be increased by coupling it with a DCF+ that has a positive dispersion and a lower RDS than that of the transmission fiber. Transmission fibers typically have positive dispersion and positive dispersion slope, and thus a positive RDS. The higher the RDS, the smaller the usable bandwidth. Some transmission fibers have very high RDS values, which translates into reduced usable bandwidth. The present invention enables the usable bandwidth of the transmission link to be increased by enabling the RDS value of the transmission link (i.e., the combined transmission fiber and DCF+) to be reduced by combining the transmission fiber with a DCF+ having a positive dispersion and a lower RDS value than the RDS value of the transmission fiber.

For example, a standard single-mode fiber, such as that commonly used as a transmission fiber, has a positive dispersion and a relatively low RDS. This type of fiber could be employed as the DCF+ and combined with the actual transmission fiber to reduce the overall RDS of the transmission link comprising transmission fiber and DCF+. The present invention is not limited with respect to the type of fiber used for the DCF+ or its dispersion and dispersion slope. The present invention also is not limited to any particular transmission fiber.

Figure 2:
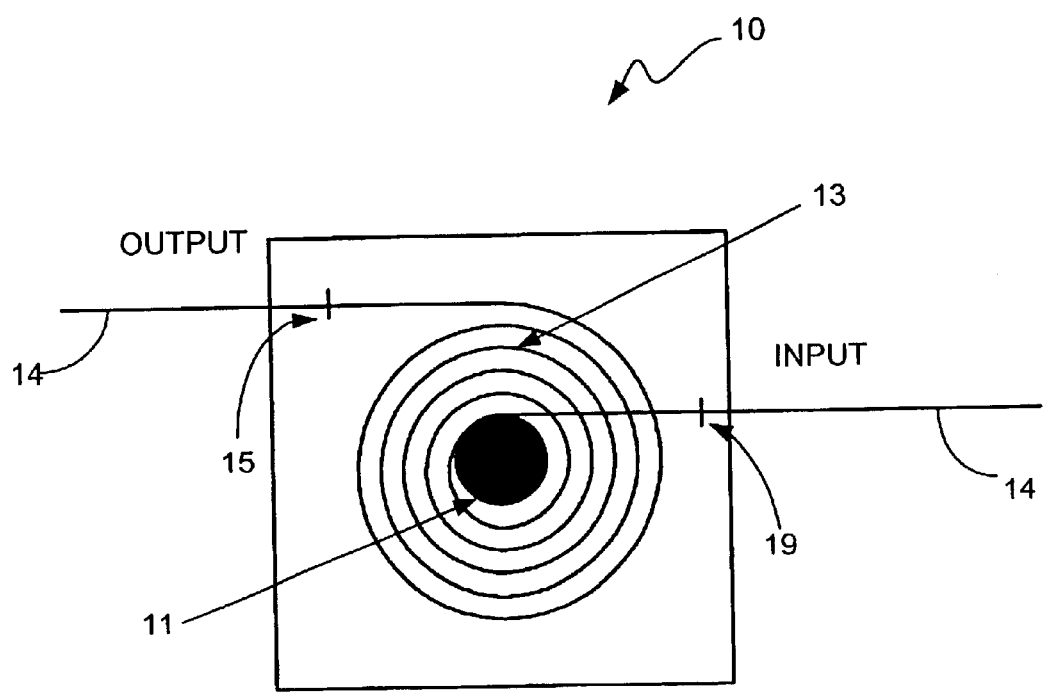
FIG. 2 is a dispersion compensation module (DCM) comprising a DCF+ for increasing the usable bandwidth of the transmission link.

FIG. 2 illustrates a DCM box 10 in accordance with an example embodiment of the present invention. The DCM box comprises a spool 11 on which a DCF+ 13 having the properties discussed above (i.e., a lower RDS than that of the transmission fiber). The DCF+ 13 is coupled to the transmission fiber 14 at splice locations 15 and 19 by. Because the RDS value of the DCM (i.e., the RDS of the DCF+) is lower than that of the transmission fiber 14, the RDS of the combination of the DCF+ 13 and the transmission fiber 14 is reduced below the RDS of the transmission fiber, which provides the transmission link with a greater usable bandwidth than before being compensated.

Figure 3:
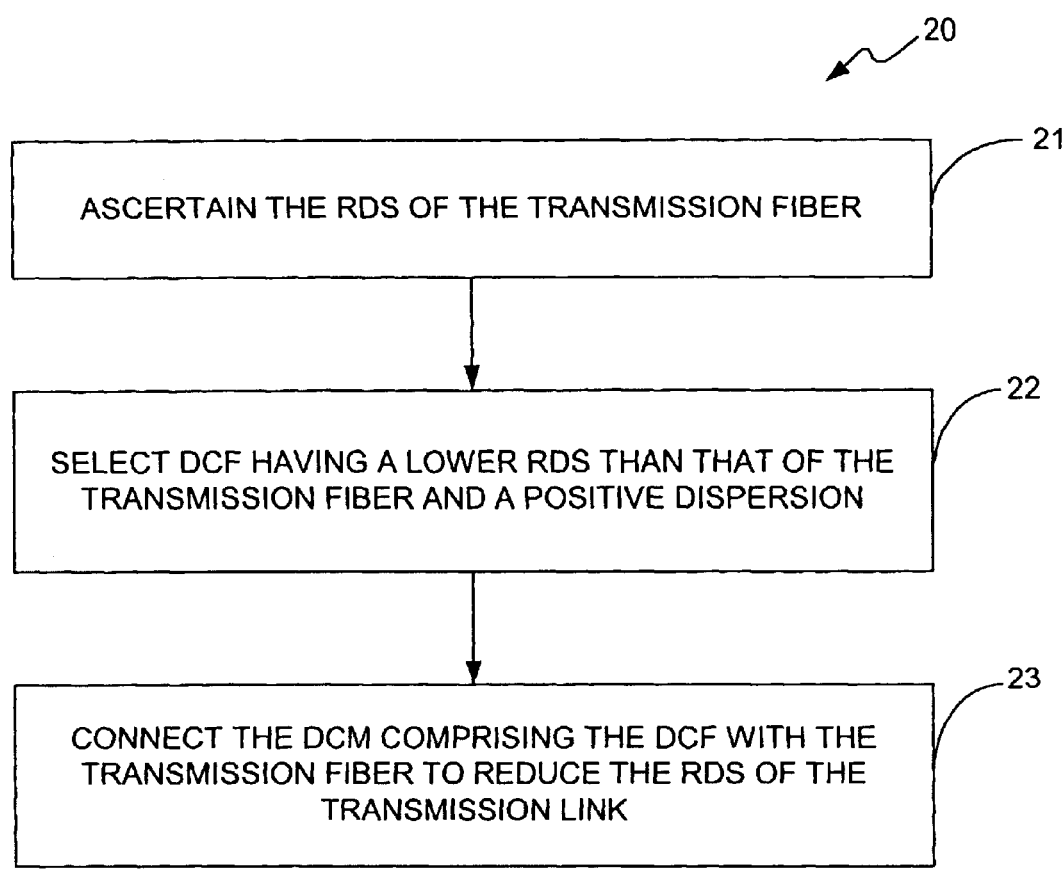
FIG. 3 is a flow chart illustrating the method of the present invention in accordance with an example embodiment.

FIG. 3 is a flow chart illustrating the method 20 of the present invention in accordance with the preferred embodiment. The first step is to obtain the RDS of the transmission fiber, as indicated by block 21. Once the RDS is obtained, a DCF+ is selected that has a positive dispersion and a lower RDS than the RDS of the transmission fiber, as indicated by block 22. The DCM that contains the DCF is then connected to the transmission fiber by coupling the ends of the DCF to the transmission fiber in the manner discussed above with reference to FIG. 2. This step is represented by block 23.

The transmission fiber can also be coupled to a DCM comprising a DCF+ having the properties described above (i.e., having a lower RDS than that of the transmission fiber and which adds positive dispersion to the transmission link) and a negative dispersion compensation fiber (hereinafter "DCF−") with a dispersion of equal amount and opposite sign to that of the combined transmission fiber and the DCF+. The DCF− has an RDS that is at least substantially equal (i.e., matched) to that of the combined transmission fiber and DCF+. Therefore, DCF− compensates for the dispersion in the combined transmission fiber and DCF+, thereby increasing the usable bandwidth of the transmission fiber compared to direct dispersion compensation of the transmission fiber by a single DCF−. An example embodiment for implementing this multi-DCF solution will now be discussed with reference to FIG. 4.

Figure 4:
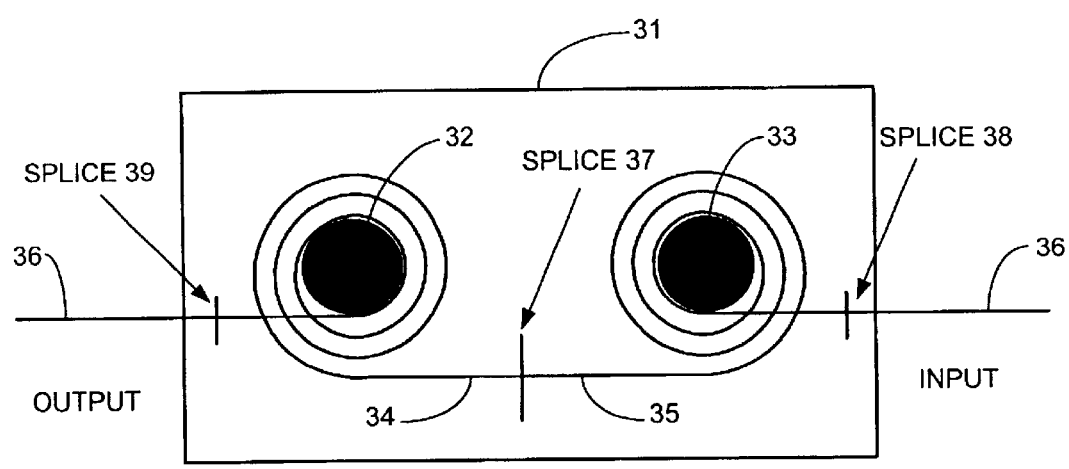
FIG. 4 is a top view of another dispersion compensation module (DCM) comprising DCF+ and DCF− for compensating dispersion in a transmission fiber while increasing the usable bandwidth of the transmission link compared to compensation with a single DCF−.

FIG. 4 illustrates a DCM 31 that comprises first and second spools 32 and 33 on which first and second fibers 34 and 35, respectively, are wound. The configuration shown in FIG. 4 enables multiple DCFs to be joined to each other at splice location 37 and to the transmission fiber 36 at splice locations 38 and 39. The first DCF+ 34 adds dispersion to the transmission link (transmission fiber and DCF+ 34) and reduces the RDS of the transmission link (by having a lower RDS than that of the transmission fiber). The second DCF− compensates the dispersion of the combined DCF+ and transmission fiber. This combination increases the usable bandwidth of the transmission fiber 36 compared to the compensation of the transmission fiber by a single DCF−. FIGS. 2 and 4 are merely two examples of DCM configurations that are suitable for use with the present invention.

The lengths of the DCFs can be obtained from the following equations:

$$L_{DCF+} = -D_{transfiber}/L_{transfiber})/D_{DCF+} * (RDS_{DCF-} - RDS_{transfiber})/(RDS_{DCF-} - RDS_{DCF+}) \quad \text{(Eq. 5)}$$

$$L_{DCF-} = -(D_{transfiber}/L_{transfiber} + D_{DCF+} * L_{DCF+})/D_{DCF-}, \quad \text{(Eq. 6)}$$

where $L_{DCF+}$ is the length of DCF+, $L_{DCF-}$ is the length of DCF−, $D_{transfiber}$ is the dispersion of the transmission fiber, which is known, $L_{transfiber}$ is the length of the transmission fiber, which is known, $RDS_{DCF-}$ is the RDS of DCF−, which is known, $RDS_{transfiber}$ is the RFS of the transmission fiber, which is known, and $RDS_{DCF+}$ is the RDS of DCF+, which is known. The values $D_{transfiber}$, $L_{transfiber}$, and $RDS_{transfiber}$ may vary from the actual values of the transmission fiber if that is desirable for the amount of dispersion of the transmission fiber that shall be compensated.

It should be noted that the above-described embodiments of the present invention are examples of implementations. Those skilled in the art will understand from the disclosure provided herein that many variations and modifications may be made to the embodiments described without departing from the scope of the present invention. All such modifications and variations are within the scope of the present invention.

What is claimed is:

1. An optical fiber transmission link designed to have increased usable bandwidth, the optical fiber transmission link comprising a transmission fiber and at least a first dispersion compensating fiber, DCF1, the first dispersion compensating fiber DCF1 having a dispersion, D1, a dispersion slope, S1, and a relative dispersion slope, RDS1, the transmission fiber having a dispersion, $D_{TransFiber}$, a dispersion slope, $S_{TransFiber}$, and a relative dispersion slope, $RDS_{TransFiber}$, and wherein RDS1 is less than $RDS_{TransFiber}$, DCF1 being coupled with the transmission fiber to form the transmission link, the transmission link having a relative dispersion slope, $RDS_{Trans\ link}$, that is less than $RDS_{TransFiber}$.

2. The optical fiber transmission link of claim 1, wherein RDS1 is selected to be lower than $RDS_{Trans.fiber.}$ in order to decrease the RDS of the transmission link $RDS_{Trans\ link}$.

3. The optical transmission link of claim 1, wherein the dispersion slope S1 of DCF1 is a relatively small, positive dispersion slope.

4. The optical transmission link of claim 1, wherein the dispersion slope S1 of DCF1 is negative.

5. The optical transmission link of claim 1, wherein the dispersion D1 of DCF1 is positive.

6. The optical transmission link of claim 1, further comprising a second DCF, DCF2, having an RDS, RDS2, that substantially matches $RDS_{Trans\ link}$, the DCF2 being coupled to DCF1, DCF2 compensating the dispersion in a portion of the transmission link comprising the transmission fiber coupled to DCF1.

7. The optical transmission link of claim 6, wherein DCF2 has a negative dispersion, D2.

8. The optical transmission link of claim 7, wherein the transmission fiber has a length $L_{TransFiber}$ and wherein lengths L1 and L2 of DCF1 and DCF2, respectively, are defined by:

$$L1 = -D_{TransFiber} * L_{TransFiber}/D1 * (RDS2 - RDS_{TransFiber})/(RDS2 - RDS1)$$

and $$L2 = -(D_{TransFiber} * L_{TransFiber} + D1 * L1)/D2.$$

9. A dispersion compensation module (DCM) having an input and an output, the DCM designed to provide a transmission link with increased usable bandwidth, the DCM comprising:

at least a first dispersion compensating fiber, DCF1, having a first end coupled to the input of the DCM and a second end coupled to the output of the DCM, the first dispersion compensating fiber DCF1 having a dispersion, D1, a dispersion slope, S1, and a relative dispersion slope, RDS1, the DCM being coupled at its input and output to a transmission fiber to form a transmission link, the transmission fiber having a dispersion, $D_{TransFiber}$, a dispersion slope, $S_{TransFiber}$, and a relative dispersion slope, $RDS_{Transfiber}$, and wherein RDS1 is less than $RDS_{TransFiber}$, the transmission link having a relative dispersion slope, $RDS_{Trans\ link}$, that is less than $RDS_{TransFiber}$.

10. The DCM of claim 9, wherein RDS1 is selected to be lower than $RDS_{Trans\ Fiber}$ in order to decrease the RDS of the transmission link $RDS_{Trans\ link}$.

11. The DCM of claim 9, wherein the dispersion slope S1 of DCF1 is a relatively small, positive dispersion slope.

12. The DCM of claim 9, wherein the dispersion slope S1 of DCF1 is negative.

13. The DCM of claim 9, wherein the dispersion D1 of DCF1 is positive.

14. A dispersion compensation module (DCM) having an input and an output, the DCM designed to provide a transmission link with increased usable bandwidth, the DCM comprising:

a first dispersion compensating fiber, DCF1, having a first end coupled to an input of the DCM, a second end, a dispersion, D1, a dispersion slope, S1, and a relative dispersion slope, RDS1; and a second dispersion compensating fiber, DCF2, having a first end coupled to the second end of DCF1, a dispersion D2, a dispersion slope, S2, and a relative dispersion slope, RDS2, the DCM being coupled at its input to a transmission fiber to form a transmission link, the transmission fiber having a dispersion, $D_{TransFiber}$, a dispersion slope, $S_{TransFiber}$, and a relative dispersion slope, $RDS_{TransFiber}$, and wherein RDS1 is less than $RDS_{TransFiber}$, the coupled transmission fiber and first dispersion compensating fiber DCF1 comprising a transmission link having a combined relative dispersion slope, $RDS_{Translink}$, that is less than $RDS_{TransFiber}$, wherein reducing $RDS_{Translink}$, below $RDS_{TransFiber}$ increases the usable bandwidth of the transmission link.

15. The DCM of claim 14, wherein RDS2 substantially matches $RDS_{Trans\ link}$, and wherein DCF2 compensates the dispersion of the transmission link, and wherein a usable bandwidth of the transmission fiber is increased when DCF2 is compensating the transmission link compared to a case where a single DCF+ is compensating the transmission fiber.

16. The DCM of claim 14, wherein DCF2 has a negative dispersion, D2.

17. The DCM of claim 16, wherein the transmission fiber has a length $L_{TransFiber}$ and wherein lengths L1 and L2 of DCF1 and DCF2, respectively, are defined by:

$$L1\ D_{TransFiber} * L_{TransFiber}/D1 * (RDS2-RDS_{TransFiber})(RDS2-RDS1$$

and $$L2 = -(D_{TransFiber} * L_{TransFiber} + D1 * L1)/D2.$$

18. A method for performing dispersion compensation while increasing the usable bandwidth of a transmission link, the method comprising the steps of:

selecting at least a first dispersion compensating fiber, DCF1, to be coupled with a transmission fiber, wherein DCF1 has a dispersion, D1, a dispersion slope, S1, and a relative dispersion slope, RDS1, the transmission fiber having a dispersion, D, a dispersion slope, S, and a relative dispersion slope, $RDS_{TransFiber}$, and wherein DCF1 is selected to so that RDS1 is less than $RDS_{TransFiber}$; and coupling a first end of DCF1 with the transmission fiber to form a transmission link, the transmission link having a relative dispersion slope $RDS_{Translink}$, and wherein $RDS_{Translink}$ is less than $RDS_{TransFiber}$.

19. The method of claim 18, further comprising the steps of:

selecting a second dispersion compensating fiber, DCF2, having a dispersion D2, a dispersion slope, S2, and a relative dispersion slope, RDS2; and coupling a first end of DCF2 to a second end of DCF1, wherein RDS2 is substantially equal to $RDS_{Translink}$.

20. The method of claim 19, wherein D2 is a negative dispersion.

21. The method of claim 20, wherein the transmission fiber has a length $L_{TransFiber}$ and wherein lengths L1 and L2 of DCF1 and DCF2, respectively, that are combined with the transmission fiber and with DCF2, respectively are defined by:

$$L1 = -D_{TransFiber} * L_{Transfiber}/D1 * (RDS2-RDS_{TransFiber})/(RDS2-RDS1)$$

and $$L2 = -(D_{TransFiber} * L_{TransFiber} + D1 * L1)/D2.$$

* * * * *